Sept. 16, 1924.

O. E. BARBER

REFACING TOOL

Filed Jan. 30, 1924

Inventor
Orren E. Barber
Williams Bradbury
McCabb & Pince Attys.

Sept. 16, 1924.

O. E. BARBER 1,508,587

REFACING TOOL

Filed Jan. 30, 1924    2 Sheets-Sheet 2

Inventor
Orren E. Barber

Patented Sept. 16, 1924.

1,508,587

UNITED STATES PATENT OFFICE.

ORREN E. BARBER, OF CHICAGO, ILLINOIS, ASSIGNOR, BY DIRECT AND MESNE ASSIGNMENTS, TO KIRK-BARBER COMPANY, A COPARTNERSHIP COMPOSED OF W. T. KIRK, A. T. KIRK, AND O. E. BARBER, OF CHICAGO, ILLINOIS.

REFACING TOOL.

Application filed January 30, 1924. Serial No. 689,499.

*To all whom it may concern:*

Be it known that I, ORREN E. BARBER, a citizen of the United States, and resident of Chicago, in the county of Cook and State of Illinois, have invented a certain new and useful Improvement in Refacing Tools, of which the following is a full, clear, concise, and exact description, reference being had to the accompanying drawings, forming a part of this specification.

My invention concerns refacing tools, more especially tools for refacing the ring gear seats on the differential gear cages of automobiles. In the usual automobile construction, the differential pinions are journaled in a cage, two of the pinions being secured to the inner ends of the rear axles, and the others permitted to idle. The cage itself is provided with an annular seat upon which is secured the ring gear which meshes with the usual bevel pinion on the drive shaft. When the ring gear breaks or is subjected to unusual strain, such for example as that caused by a broken gear tooth passing between the intermeshed gears, the flange which carries the ring gear seat is often warped so that the seat is no longer at a normal to the axis of the cage. As is well known, this results in undue noise and wear on the bevel gears. In new automobiles also it is often found necessary to resurface the ring gear seats where the cages are of the two-piece type here shown, wherein the halves are bolted together after machining with the result that the seats are drawn out of a normal to the axes defined by the opposed hub portions of the cages.

One object, therefore, of this invention is the provision of a refacing tool for differential cage ring gear seats which will reface the seats at true normals to their axes without the necessity of a machinist spending time to true the cages in a lathe preparatory to the cutting operations.

I further contemplate the provision of a refacing tool for this work which is simple in construction and may be manufactured at a low cost; which is readily adjustable to take cages having different sizes of seats and hub portions; which may conveniently be operated by hand; which embodies improved means for rotating the cage; in which the cutting tool holder is firmly held in its adjusted portions; and wherein the work may be quickly placed and removed. Other features of my invention will appear from the following description of an embodiment thereof as illustrated in the accompanying drawings, wherein:

Figure 1:
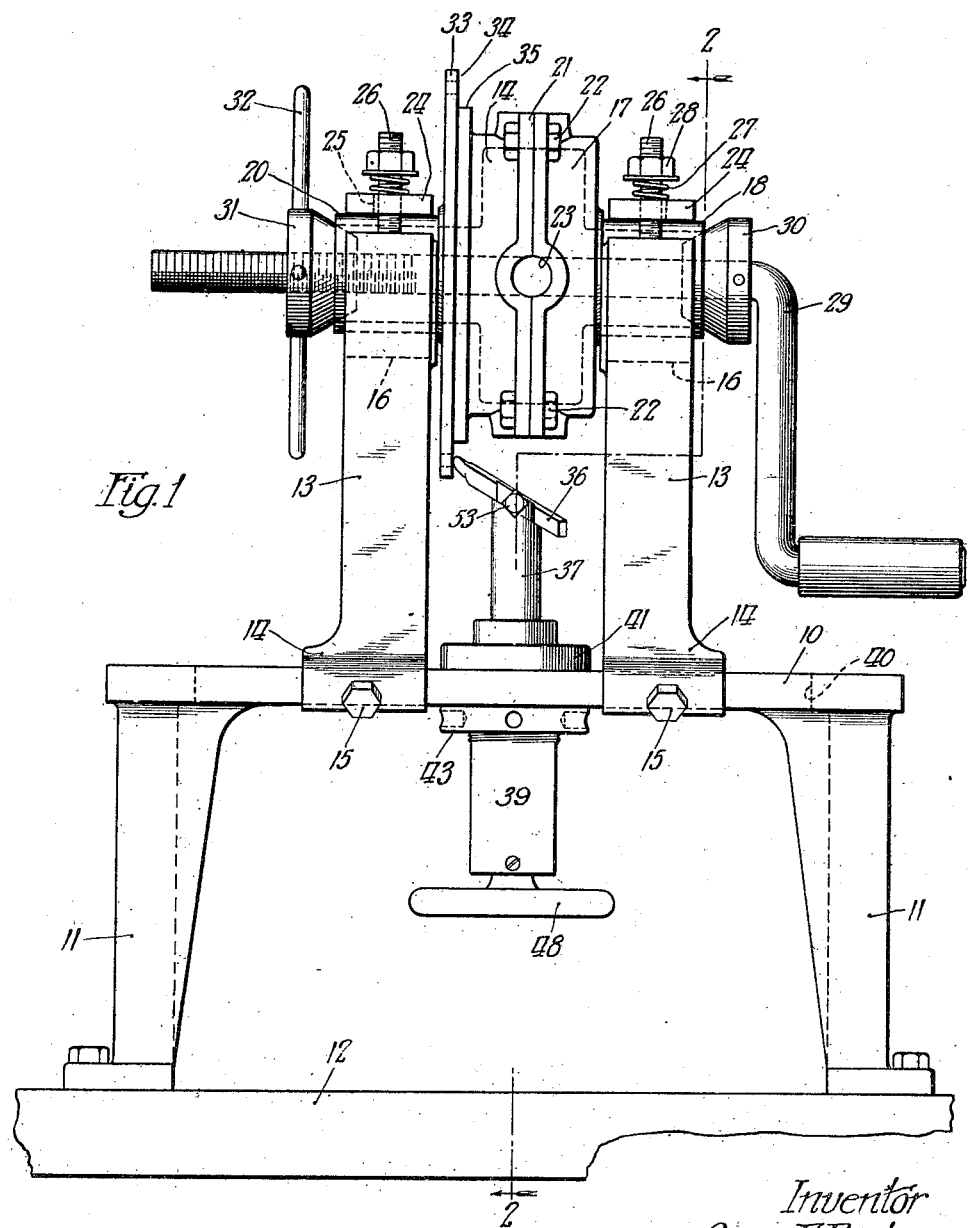
Figure 1 is a side elevation of the refacing tool.

The refacing tool as here shown comprises a base plate 10, provided at each end with downwardly extending legs 11, which are adapted to be secured to a work bench or other suitable support 12. The base plate 10 is of dovetail cross section, and preferably provided with a smooth upper surface. Upon the base plate is mounted a pair of upwardly extending bearing supports 13, which rest upon the upper surface of the plate 10 and are provided with lateral flanges 14 which overlie and mate the beveled edges of the plate 10. One and preferably both of the bearing supports 13 are slidable along the plate 10, set screws 15 being provided to lock them in the desired spaced relation. The upper end of each bearing support 13 is provided with an upwardly opening V shaped slot 16.

Figure 3:
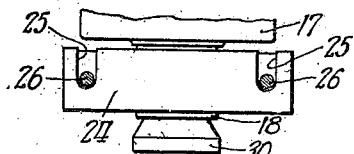
Figure 3 is a plan view of a bearing plate taken along the line 3—3 of Figure 2.
Figure 2:
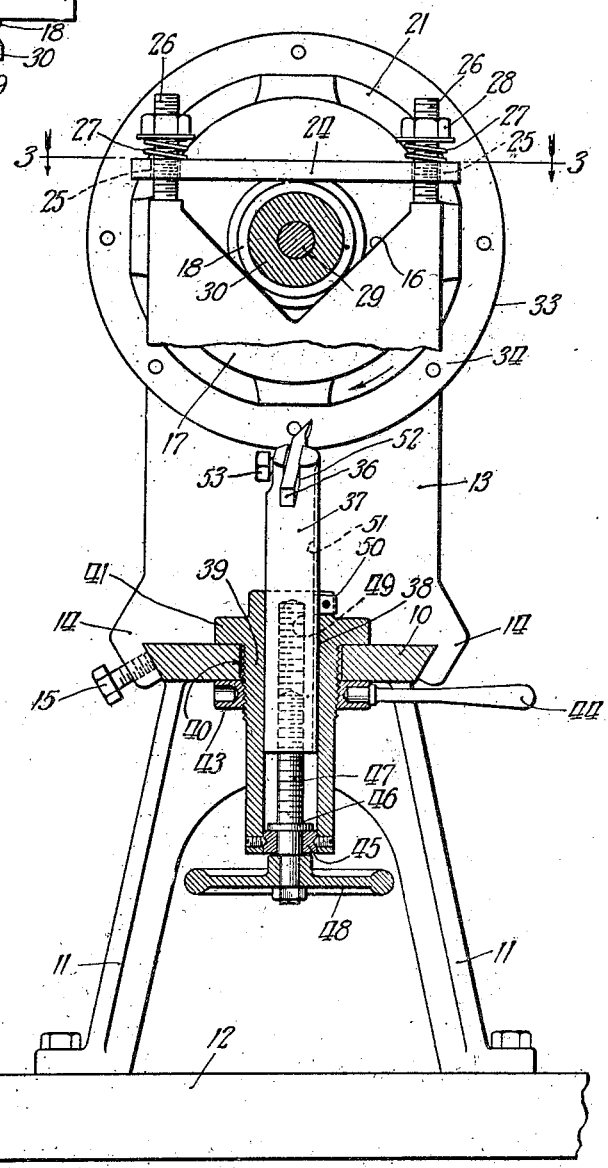
Figure 2 is a transverse vertical section thereof taken along the line 2—2 of Figure 1.

The differential cage which is here shown as of the two piece type comprises a right half 17, having an outwardly extending hub portion 18 and a left half 19, having a similar and outwardly extending hub portion 20, the two halves being provided with mating flanges 21 through which pass clamping bolts 22. The mating flanges 21 co-operate to form bearing 23 for the idling pinions. The cage is placed in the device with the hub portions 18 and 20 resting in the respective V shaped slots of the bearing supports. Because of this V shaped construction the supports will obviously adapt themselves to cages having varying sizes of hub portions, at the same time retaining a substantially horizontal axis of rotation for the cages. The hub portions are held down in the bearing thus afforded by means of plates 24 which are provided with slots 25 adjacent their ends as shown in Figure 3 through which pass bolts 26 extending from the bearing supports. Short coil springs 27 are preferably placed between the plates 25 and the nuts 28 to provide sufficient downward pressure on the hub portions without danger of binding. The plates 24 are provided with the slots 25 rather than with holes in order that the plates may be quickly placed in position without the necessity of removing the nuts 28.

In order to get a sufficient hold upon the cage for rotating it, I provide a hand crank 29, the shaft of which extends through the hollow hub portions and the central portion of the cage. Adjacent the crank end, the shaft is provided with a cone 30 securely pinned thereto while the opposite end of the shaft is threaded and provided with a conical nut 31 which carries a plurality of radial pins 32. After the cage has been set in its supporting bearings, the shaft of the crank 29 is pushed through the cage and the conical nut 30 is threaded onto the end thereof. By grasping the pins 32 the operator may draw the cone 30 and the conical nut 31 into the ends of the respective hub portions. This serves not only to bring the axis of the crank 29 coincident with the axis of the cage but also furnishes a means for so grasping the cage that it may be rotated without putting any distorting strain thereon or tending to lift the cage from the bearings afforded by the V shaped slots 16.

As shown in Figure 1, the left half 19 of the cage is provided intermediate the hub portion 20 and the flange 21 with a gear retaining flange 33 the inner face of which forms a seat 34 upon which the ring gear is riveted. The usual shoulder 35 is also provided at the inner edge of the seat for centering the ring gear. A cutting tool 36 for refacing this seat 34 is mounted in the upper end of a cylindrical post 37, which is reciprocably mounted in the vertical bore 38 of a sleeve 39, which in turn passes through a slot 40 which extends longitudinally of the base plate 10. The sleeve 39 is provided with an upper shoulder 41 and a threaded portion 42 upon which a nut 43 is threaded to clamp the sleeve in the desired position along the slot 40. The detachable pin 44 is preferably provided for turning the nut 43. Within the lower end of the bore 38 is positioned a ring 45 disposed between a shoulder 46 on a feed screw 47 and a wheel 48 at the end of the screw 47. The upper end of the screw 47 extends into a threaded bore 49 at the lower end of the post 37. Rotation of the post relative to the sleeve 39 is prevented by a key 50 on the sleeve which rides in the key way 51 on the post 37. It is obvious that while turning the hand crank 29 with his right hand, the operator may feed the cutting tool 36 up and down radially of the seat by turning the hand wheel 48.

The upper end of the post 37 is obliquely cut at an angle of about 30 degress and provided with an end slot 52 parallel with the oblique end of the post. The cutting tool 36 is set in this slot 52, being there secured by a set screw 53. As shown in the drawings, the cutting tool 36 is also set at a slight angle in the horizontal plane, this adjustment being afforded by rotation of the sleeve 39 within the slot 40 before the clamping nut 43 is tightened.

In order to adapt the device for the refacing of differential cages of other sizes, the nuts 28 may be threaded upward on the bolts 26 to compensate for various sizes of hub portions and the bearing supports 13 may be slid along the base plate 10 for adapting the device to a greater or less distance between the hub portions of the cages. By loosening the nut 43, the tool holding post 37 may be slid along the slot 40 to the most advantageous position. It is also possible to loosen the set screw 53 and slide the cutting tool 36 along the slot 52. For larger diameter gear seats the hand wheel 48 may be turned to raise or lower the cutting tool. It is to be especially observed that in the device here shown, the cage is mounted to rotate about the same axis as it does when in use in the automobile. This is because I center the cage by the outer periphery of the hub portions 20 which when the device is assembled in the automobile, serve as the inner race rings for the roller bearings by which the cage is journaled in the differential housing. When the gear seat 34 is refaced by the device here shown, the ring gear when the differential is reassembled will rotate at a normal to the axis of the cage as it is journaled in the automobile.

Having thus described my invention, what I claim is:

1. A device for refacing the ring gear seat of a differential cage, wherein the cage is provided with opposed hub portions, the peripheries of which determine the axis of the ring gear when in use, said device comprising spaced V-shaped bearings for journaling said hub portions, yielding means for holding said hub portions against said V-shaped bearings, a cutting tool, means for relatively rotating the cage and tool, and means for feeding said tool across said seat.

2. A device for refacing the ring gear seat of a differential cage wherein the cage is provided with opposed hub portions, the peripheries of which determine the axis of the ring gear when in use, said device comprising spaced bearings for journaling said hub portions, means for rotating said cage comprising a shaft passing axially therethrough, conical members on said shaft and entering the bores of said hub portions for clamping said shaft to said cage, a cutting tool, and means for feeding said tool across said seat.

3. A device for refacing the ring gear seat of a differential cage wherein the cage is provided with opposed hub portions, the peripheries of which determine the axis of the ring gear when in use, said device comprising spaced bearings for journaling said hub portions, a shaft provided with a hand crank for rotating said cage, said shaft extending axially of said cage through said hub portions, a pair of conical members annularly contacting the ends of said hub portions, one of said members being threaded on said shaft whereby said shaft may be clamped to said cage, a cutting tool, and means for feeding said tool across said seat.

4. A device for refacing the ring gear seat of a differential cage wherein the cage is provided with opposed hub portions, the peripheries of which determine the axis of the ring gear when in use, said device comprising spaced bearing members have V-shaped bearing surfaces, plates across the open sides of said bearings, and means for yieldingly holding said plates to bear against said hub portions for centering the latter in said bearings.

5. A device for refacing the ring gear seat of a differential cage wherein the cage is provided with opposed hub portions, the peripheries of which determine the axis of the ring gear when in use, said device comprising spaced bearing members having V-shaped bearing surfaces, plates across the open sides of said bearing members for urging said hubs toward the converging surfaces of said bearing members to center said hub portions, means for clamping said plates to said device, and springs interposed between said plates and said device to permit said plates to yield.

6. A device for refacing the ring gear seats of differential cages having opposed hub portions, comprising a base plate, a pair of spaced bearing supports thereon having bearing surfaces for journaling the peripheries of said opposed hub portions, one of said supports being slidable relatively to the other along said plate, a cutting tool, and means for feeding said tool across said faces.

7. A device for refacing the ring gear seats of differential cages having opposed hub portions, comprising a base plate, a pair of spaced upright bearing supports provided with bearing surfaces for journaling the peripheries of said opposed hub portions, one of said supports being slidable relatively to the other along said plate, a vertically reciprocable post mounted on said plate, a cutting tool carried on said post, and means for sliding said post to feed said tool across said faces.

8. A device for refacing the ring gear seats of differential cages having opposed hub portions, comprising a base plate, a pair of spaced upright bearing supports provided with bearing surfaces for journaling the peripheries of said opposed hub portions, one of said supports being slidable relatively to the other along said plate, a slot in said plate between said supports, a vertical sleeve extending through said slot, means for clamping said sleeve to said plate in a plurality of adjusted positions, a post slidable within said sleeve, a cutting tool on said post, and a screw threaded member for sliding said post to feed said tool across said faces.

9. A device for refacing the ring gear seats of differential cages, comprising a base plate provided with depending supporting legs, a pair of spaced upright bearing supports provided with bearing surfaces for journaling the cages, one of said supports being slidable relatively to the other along said plate, a slot in said plate, a vertical sleeve extending through said slot, means for clamping said sleeve in said plate in a plurality of adjusted positions, a post slidable within said sleeve, a cutting tool on said post, and a feed screw for sliding said post, said screw, beneath said plate, being provided with a hand wheel for advancing said tool.

10. A device for refacing the ring gear seat of a differential cage, comprising means for journaling said cage, means for rotating said cage, a post slidably mounted on said device, means for sliding said post substantially radially of the axis of said cage, an oblique slot across the end of said post, a cutting tool clamped in said slot for engaging said seat and means to prevent rotation of said post, said last mentioned means being releasable to permit rotary adjustment of said post.

11. A device for refacing the ring gear seat of a differential cage wherein the cage is provided with opposed hub portions, the peripheries of which determine the axis of the ring gear when in use, said device comprising spaced bearings having converging bearing surfaces for journalling the peripheries of said hub portions, means for rotating said cage, and a cutting tool for engaging said face.

In witness whereof, I hereunto subscribe my name this 25th day of January, 1924.

ORREN E. BARBER.

Witnesses:
J. DAVID DICKINSON,
FRANK LELIS.